US006420724B1

(12) United States Patent
Struye et al.

(10) Patent No.: US 6,420,724 B1

(45) Date of Patent: Jul. 16, 2002

(54) METHOD OF IMAGE FORMATION, DOSIMETRY AND PERSONAL MONITORING

(75) Inventors: Luc Struye, Mortsel; Paul Leblans, Kontich; Peter Willems, Stekene, all of (BE); Jean-François Gervais, Mérignac (FR)

(73) Assignee: Agfa-Gevaert, Mortsel (BE)

(*) Notice: Subject to any disclaimer, the term of this patent is extended or adjusted under 35 U.S.C. 154(b) by 181 days.

(21) Appl. No.: 09/598,501

(22) Filed: Jun. 22, 2000

Related U.S. Application Data

(60) Provisional application No. 60/140,982, filed on Jun. 29, 1999.

(30) Foreign Application Priority Data

Jun. 22, 1999 (EP) ........................................... 99201988

(51) Int. Cl.[7] ............................ G01T 1/10; G21K 4/00

(52) U.S. Cl. ................. 250/585; 250/484.2; 250/484.5; 250/459.1; 250/362

(58) Field of Search ................................ 250/585, 581, 250/582, 588, 580, 583, 362, 458.1, 459.1, 472.1, 473.1, 483.1, 484.2, 486.1

(56) References Cited

U.S. PATENT DOCUMENTS

| | | | | | |
|---|---|---|---|---|---|
| RE31,847 | E | | 3/1985 | Luckey | |
| 4,652,735 | A | * | 3/1987 | Ishikawa et al. | 250/208.1 |
| 4,973,134 | A | | 11/1990 | Finkenzeller et al. | |
| 5,208,459 | A | * | 5/1993 | Morrone et al. | 250/484.4 |
| 5,446,334 | A | * | 8/1995 | Gaffney | 250/338.3 |
| 5,817,945 | A | * | 10/1998 | Morris et al. | 73/762 |
| 5,905,260 | A | * | 5/1999 | Sage et al. | 250/306 |
| 6,087,666 | A | * | 7/2000 | Huston et al. | 250/361 R |
| 6,281,617 | B1 | * | 8/2001 | Qiu et al. | 310/311 |

FOREIGN PATENT DOCUMENTS

| | | | | |
|---|---|---|---|---|
| EP | 0 751 200 A1 | | 1/1997 | |
| GB | 2 232 119 A | | 12/1990 | |
| WO | WO 97/16834 | * | 5/1997 | H01C/10/10 |

OTHER PUBLICATIONS

Patent Abstracts of Japan, vol. 015, No. 344 (P–1245), Aug. 30, 1991 & JP 03 130632 A (Fuji Photo Film Co. Ltd.), Jun. 4, 1991.

Patent Abstracts of Japan, vol. 1999, No. 02, Feb. 26, 1999 & JP 10 300858 A (Shimadzu Corp.), Nov. 13, 1998.

B.P. Chandra et al: "Classification of Mechanoluminescence", Crystal Research and Technology, 1995, Germany, vol. 30, No. 7, pp. 885–896, XP000866417.

S. Tiwari et al: "Preparation and Characterization Of Gold Doped (Zn,Cd)S Mixed Phosphors For Mechano–Optical Transducers", Bulletin of Materials Science, Sep. 1995, Indian Acad., Sci., India, vol. 18, No. 5, pp. 503–515, XP000866422.

T. Nakajima et al: "Preparation And Dosimetric Properties Of A Highly Sensitive LiF Thermoluminescent Dosimeter", Health Physics, Jan. 1979, UK, vol. 36, No. 1, pp. 79–82, XP000867137.

* cited by examiner

*Primary Examiner*—Constantine Hannaher
*Assistant Examiner*—Albert Gagliardi
(74) *Attorney, Agent, or Firm*—Breiner & Breiner, L.L.C.

(57) ABSTRACT

A method has been provided of image formation, dosimetry or personal monitoring wherein said method comprises the steps of (a) storing energy in stimulable phosphors coated in one or more layers of said screen or panel; (b) converting said energy to emission energy and (c) detecting said energy, characterized in that said converting step proceeds by means of a source of pressure energy.

13 Claims, 2 Drawing Sheets

METHOD OF IMAGE FORMATION, DOSIMETRY AND PERSONAL MONITORING

This application claims the benefit of U.S. Provisional Application No. 60/140,982, filed Jun. 29, 1999.

FIELD OF THE INVENTION

The present invention is related with a novel method of image formation (whether or not radiographic), dosimetry or personal monitoring, and more particularly, to a method to release energy stored in stimulable phosphors, coated in storage phosphor screens or panels.

BACKGROUND OF THE INVENTION

Well-known in diagnostic imaging is the use of phosphors in the production of X-ray images. In a conventional radiographic system an X-ray radiographic image is obtained by X-rays transmitted imagewise through an object and converted into light of corresponding intensity in a so-called intensifying screen (X-ray conversion screen) wherein phosphor particles absorb transmitted X-rays and convert them into visible light and/or ultraviolet radiation. As silver halide grains or crystals, present in emulsions coated in layers of a silver halide photographic film material are more sensitive to the thus converted X-ray energy than to direct impact of X-rays (due to a less effective absorption of those energetic X-rays) the said conversion is in favour of image formation on the film material.

According to another method of recording and reproducing an X-ray pattern disclosed e.g. in U.S. Pat. No. 3,859, 527 a special type of phosphor is used, known as a photostimulable phosphor, which being incorporated in a panel is exposed to incident pattern-wise modulated X-rays and as a result thereof temporarily stores energy contained in the X-ray radiation pattern. At some interval after the exposure, a beam of visible or infra-red light scans the panel in order to stimulate the release of stored energy as light that is detected and converted to sequential electrical signals which can be processed in order to produce a visible image. For this purpose, the phosphor should store as much as possible of the incident X-ray energy and emit as little as possible of the stored energy until stimulated by the scanning beam. This is called "digital radiography" or "computed radiography".

Use of alkali metal halide phosphors in storage screens or panels is well known in the art of storage phosphor radiology, wherein at least part of the energy contained in an X-ray pattern is temporarily stored. The high crystal symmetry of these phosphors makes it possible to provide structured screens and binderless screens, in favour of image quality. Examples of such alkali metal phosphor can be found in several documents. In e.g. U.S. Pat. No. 5,028,509 a phosphor corresponding to general formula:

$$(M_{1-x}.M'_x)X.aM^{2+}X'_2.bM^{3+}X''_3{:}dB,$$

wherein M is Cs or Rb, M' is at least one metal selected from the group consisting of Li, Na, K, Rb, and Cs, $M^{2+}$ is at least one metal selected from the group consisting of Be, Mg, Ca, Sr, Ba, Zn, Cd, Cu and Ni, $M^{3+}$ is at least one metal selected from the group Sc, Y, La, Ce, Pr, Nd, Pm, Sm, Eu, Gd, Tb, Dy, Ho, Er, Tm, Yb, Lu, Al, Ga and In; X, X' and X" can be the same or different and each represents a halogen atom selected from the group consisting of F, Br, Cl, I with the proviso that all X' atoms are the same, B is an element selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In. $0 \leqq x \leqq 1$ en $0 \leqq a \leqq 1$ en $0 \leqq b \leqq 0.5$ en $0 \leqq d \leqq 0.2$.

In U.S. Pat. No. 5,055,681 a binderless screen comprising the phosphor as disclosed in U.S. Pat. No. 5,028,509 has been disclosed.

In U.S. Pat. No. 4,806,757 a CsI phosphor has been disclosed, comprising between 0.0001 to 1 mole % of at least one element selected from the group consisting of Li, K, Rb, Cu, Au, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb and Bi.

Alkali metal halide phosphors performing as desired qualities absorption characteristics, speed, storage capabilities etc. have been disclosed in EP-A 0 751 200, wherein besides high speed also high chemical stability and low sensitivity to humidity have been appreciated as well as ability to produce screens comprising vapour deposited phosphor layers providing high image definition.

The radiation image storage phosphor screen according to that invention comprises an alkali metal halide phosphor characterized in that said phosphor contains a dopant selected from the group consisting of $Ga^{1+}$, $Ge^{2+}$, $Sn^{2+}$, $Sb^{3+}$ and $As^{3+}$. In a preferred embodiment thereof the alkali metal is Cs and/or Rb.

In order to provide a method for recording X-rays following steps were recommended:

(i) exposing a photostimulable storage phosphor screen, comprising novel alkali metal halide phosphors, (ii) stimulating said photostimulable screen in order to release the stored X-ray energy as stimulated light and (iii) collecting said stimulated light.

In order to release energy stored by a stimulable phosphor use has hitherto often been made of optical light sources as mentioned hereinbefore. As a consequence thereof optical filters are required in order to separate light emitted by the storage phosphors after stimulation and light originating from the stimulation source. In order to develop a scan-head in order to scan a plate or panel built-up with stimulable phosphors in order to release said stored energy, it is recommended to reduce the volume of such a scan-head to a minimum. Especially when the detector, collecting said stimulated light is a CCD with Fiber Optic Plate (FOP), the image plate should be placed in direct contact with this fiber optic plate in order to obtain a sufficiently good resolution. Presence of any extra intermediate layer, as e.g. a filter layer, may lay burden thereupon and any measure in order to simplify the process of reading out a storage phosphor is welcome.

OBJECTS OF THE INVENTION

Therefore it is an object of the present invention to provide an easy method in order to stimulate storage phosphors and panels built up with said storage phosphors.

Moreover it is an object to provide easy detection means for the energy release by the said storage phosphors and panels, more particularly with respect to (radiographic) image formation, dosimetry and personal monitoring.

Other objects will become apparent from the description hereinafter.

SUMMARY OF THE INVENTION

The above mentioned objects are realized by providing a method of image formation, dosimetry or personal monitoring wherein said method comprises the steps of (a) storing energy in stimulable phosphors, and more particularly with tribostimulable phosphors, coated in one or more layers of said screen or panel;

(b) converting said energy to emission energy and (c) detecting said energy, characterized in that said converting step proceeds by means of a source of pressure energy.

Because the emitted light energy is proportional with the pressure applied to the tribostimulable phosphors coated in said storage screen or panel, this technique is also suitable for measuring pressure forces.

Specific features for preferred embodiments of the invention are disclosed in the dependent claims.

Further advantages and embodiments of the present invention will become apparent from the following description and drawings.

DETAILED DESCRIPTION OF THE INVENTION

Figure 1:
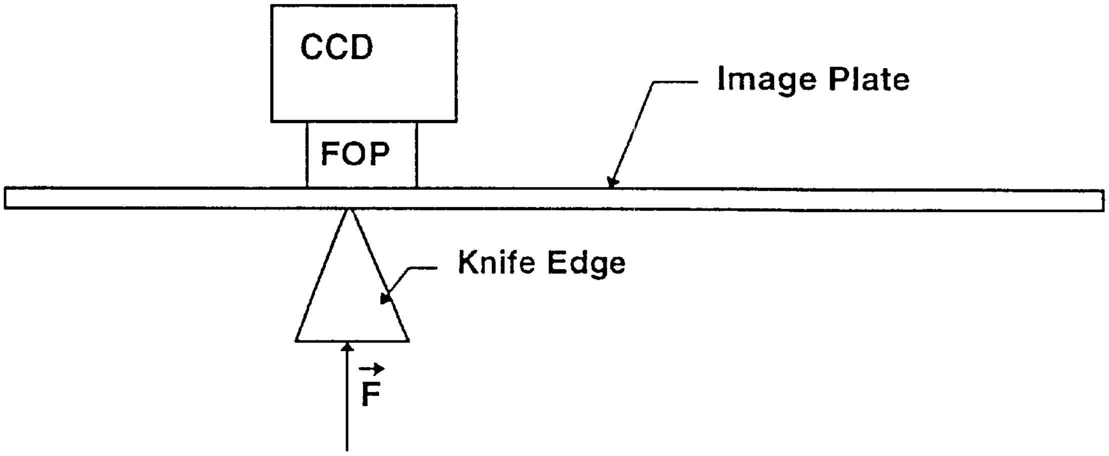
FIG. 1 shows an Image Plate essentially consisting of a storage phosphor plate wherein an "X-ray" image has been stored. By means of a Knife Edge a pressure force F is performed linewise on the Image Plate, whereby the stored energy is released and becomes readout by a CCD via a Fibre Optic Plate (FOP).

In this document the term "X-ray" should be understood as any penetrating radiation and includes i.a. radiation originating from a radioisotope (e.g. a Co60 source), radiation created by an X-ray generator of any type, radiation and high energy particles created by a high energy radiation generator (e.g. Betatron), radiation from a sample labelled with a radioisotope as is the case in e.g. autoradiography.

Although composites showing "triboluminescence" are known in literature as e.g. described in Opto & Laser Europe, issue 61, published April 1999, wherein it has been established that "composites glow where they crack" and that "Reinforced polymers that emit red, green or blue light where they fracture could give aircraft a "skin" that senses damage" as described in a report on the performance of resins containing light-emitting crystals, nothing has been suggested nor disclosed about "tribostimulability" of storage phosphors or stimulable phosphors. It has thus unexpectedly been found that conversion of energy stored in phosphor composites having energy storage properties, like the storage phosphors, well-known in image storage phosphor plates or panels used in diagnostic imaging by X-rays, converting is, besides the well-known stimulability by lasers, performed by means of a source of pressure energy.

Storage phosphors suitable for releasing stored energy therein by pressure are called "tribostimulable phosphors" in the present invention. Said tribostimulable phosphors in most general form are alkali metal-halide phosphors and, more preferably are alkali metal halide phosphors have a composition based on CsBr and CsCl. A more preferred suitable "tribostimulable" phosphor providing release of stored energy to be read-out under the influence of pressure energy is CsBr:Eu. The mechanism has also been found to apply to other phosphor compositions as there are CsBr and CsCl (without further dopant); CsBr:Eu,Gd; CsBr:Ga; CsBr:Ca; CsBr:Sr; CsBr:Gd; CsBr:CsF; CsBr:CsOH; CsBr:$Cs_2CO_3$; CsBr:$Cs_2SO_4$; CsBr:Ge; CsBr:Sn; CsBr:Au; CsCl:Eu; $CsCl_{0.5}Br_{0.5}$:Eu; CsBr:In; CsBr:Ce; CsBr:In,Ce; CsBr:Tb RbBr:Ga; RbBr:Ga,Li and more in general terms to all phosphors mentioned in U.S. Pat. No. 5,028,509 and in EP-A 0 751 200. Further interesting storage phosphors are KBr:Cu; KCl:Cu; KCl(1−x)Br(x):Eu, wherein $0<x<1$ and KCl(1−x)Br(x):Cu, wherein $0<x<1$. KBr:Eu is a particularly preferred pressure stimulable storage phosphor giving rise to the emission of blue light after having been pressure stimulated. As a further advantage e.g. versus CsBr:Eu it is much less moisture sensitive. Moreover from the point of view of dark discharge it is a very interesting and suitable pressure stimulable phosphor.

Methods suitable for the determination of "tribostimulability" of storage phosphors have been described in the Examples hereinafter. Phosphor samples of phosphors suitable for use in the context of the present invention clearly show emission of visible light after applying pressure forces. In a dark room, the light emitted by performing the said pressure force is clearly observed through an optical filter at the moment of application of said force. The intensity of emitted light caused by the pressure force is further very much higher than emitted light caused by afterglow. It has been found also that the crystals are emitting strongly when the surface of the crystal has been damaged with e.g. a knife or even with a nail of a finger. So when the tribostimulable crystal is cracked an intense light pulse is detected. When the storage phosphor crystal showing tribostimulability is not exposed to X-rays or is completely erased with a light source after stimulation it has been established that no emitted light is leaving the crystal after application of a pressure force, wherein the crystal has been damaged or cracked. It is clear that only stored energy, captured after a previous exposure with ionization radiation (as e.g. X-rays) of a composite storage phosphor crystal suitable for use in the method of the present invention is released by pressing, damaging or cracking the said crystal.

In the method according to the present invention, providing means of (radiographic) image formation, dosimetry or personal monitoring, the said method thus comprises the steps of (a) storing energy in (tribo)stimulable phosphors coated in one or more layers of said screen or panel; (b) converting said energy to emission energy and (c) detecting (or collecting) said energy, with the characteristic feature that said converting step proceeds by means of a source of pressure energy.

In one embodiment the method according to the present invention said stored energy is corresponding with energy divided homogeneously over the screen or panel or with a latent image. Said energy is, in a preferred embodiment, provided by irradiation exposure with X-rays. So in the Examples experiments were e.g. performed by irradiation of a phantom, replacing parts of the human body normally set free to e.g. X-ray exposure for diagnostic purposes, without however limiting said exposure to "X-rays" as already explained hereinbefore.

It is clear that in order to apply the method as described to the present invention irradiation energies should be high enough in order to provide storage of said energies by the tribostimulable storage phosphors.

According to the method of the present invention stimulability by pressure is provided sheetwise by a source of pressure energy. This means that the whole storage phosphor plate or panel is read-out in one step, wherein on every site of the panel pressure is applied equally by means of another panel of the same size. In another embodiment pressure is provided pixelwise by means of piezo-electrical crystals as a source of pressure energy. The storage phosphor panel and the piezo-electrical crystals are therefore preferably placed in intimate contact between two plates, wherein at least one of them (the one through which emitted light from the stimulated tribostimulable phosphor has to pass in order to be captured and to be read-out) is transparent for the light emitted after pressure stimulation by the energy-loaded storage phosphor crystals in the storage panel. In order to read out such a pixel a voltage is applied to the piezo-electrical crystal positioned to the said pixel. As the crystal is expanding thereby, its pressure thus generated is applied to the storage phosphor and, consequently the pressure stimulable storage phosphors emit energy to be read-out. Separately activated piezo-electrical crystals thus provide all pixels to be read one after another, thus generating a read-out pattern, corresponding with the original phantom irradiated with high energetic radiation.

In still another embodiment according to the method of the present invention pressure is provided linewise by means of a knife-edge or by means of a roller as source of pressure energy. By means of a knife-edge a line-wise detection is obtained over the whole storage phosphor plate or panel in a discontinuous way by alternatively moving the plate up and down. In order to get a line-wise detection over the whole storage phosphor plate or panel in a continuous way it is recommended however to provide pressure by means of a roller. Rolling the said roller over the entire surface of the storage panel makes the whole latent image stored in the storage panel to be able to become read-out.

In a particular embodiment according to the method of the present invention energy is added to the (tribostimulable) storage phosphors coated in a screen or panel in order to get it divided in a homogeneous way over the whole surface, wherein pressure is performed by means of a part of the human body, e.g. a finger, one or both hands, or one foot or both feet, without however being limi-ted thereto, whereafter a fingerprint, a print of one or both hands or a print of one or both feet is obtained by direct detection of energy released by pressure in that way or by detection, afterwards, of energy left in the storage phosphors after release of part of said energy as a consequence of pressure applied to the screen or panel.

This is not only applicable in security systems (as e.g. for fingerprints) but also in all applications wherein exact measures or sizes, e.g. of a foot or feet, are required in order to provide the best suitable (sport)shoes, or in any application wherein the body should be provided with closely fitting coatings as e.g. clothes, sportswear for all sports, and particularly for those wherein resistance should be minimized against water (for swimming and all sports and professional duty related therewith) or wind (for cycling, athletics, all sports and all forms of professional duty related therewith). Also in all applications wherein exact sizes should be known, e.g. for packaging, wherein it is difficult to measure the best fitting package, due to its irregular surface or form, this method brings a solution.

Minor differences in sizes between similar objects or between objects forming mirror images (forming e.g. "twins") are also discernible from each other. A particular application e.g. forms the detection of differences in size or form of mirror images, e.g. from feet, without however being limited thereto, in order to facilitate corrections for orthopaedists. Analogously orthodontic applications are envisaged when examining teeth.

As already set forth above in the method of the present invention useful stimulable phosphors are alkali metal-halide phosphors, and more preferably stimulable phosphors having a composition comprising at least one of CsBr, CsCl, RbBr, KBr, KCl or a combination thereof and in a more preferred embodiment said stimulable phosphor has a composition further comprising a dopant selected from the group consisting of Eu, Gd, Ga, Ca, Sr, Ge, Sn, Au, Tl, In, Sb, Tb and Ce or a combination thereof. Said dopant(s) is(are) present therein in an amount of from 500 up to 50000 p.p.m. or, expressed in an alternative way, in an amount of from 0.1 up to 5% by weight.

Alkali metal phosphors showing tribostimulability, thus suitable for use in the method according to the present invention, can be produced according to any way known in the art, starting from phosphor precursors, e.g. oxides, carbonates, sulfonates, halides, phosphates, nitrates, oxalates, lactates, acetylacetonates, malonates, phthalates, alkoxides, phenoxides or ethylenediamine derivatives of the metalions that are to be incorporated in the phosphor. These phosphor precursors are mixed in the appropriate stoechiometric proportions and are then heated for a given time. After cooling, the sintered block of phosphor is milled into fine phosphor particles. The milling operation continues until phosphor particles with the appropriate average particle size and size distribution are obtained. During the preparation of the phosphor any known flux materials can be added to the reaction mixture. Flux materials useful for use in the preparation of the phosphors according to the invention are, e.g., halides, metasilicates of alkali metals or alkaline earth metals. A very useful and preferred method for the preparation of alkali metal phosphors suitable for use in the method according to the present invention can be found in Research Disclosure Volume 358, February 1994 p 93 item 35841. Another useful method for preparation of alkali metal phosphors suitable for use in the method according to this invention can be found in U.S. Pat. No. 5,154,360. The average grain size of said alkali metal-phosphors is preferably in the range of 2 to 25 $\mu$m, more preferably in the range of 3 to 15 $\mu$m.

Alkali metal phosphors are beneficially used in order to form a radiation image storage screen or panel in order to, according to the method of the present invention, provide recording and reproducing penetrating radiation images, said method comprising the steps of i) exposing a tribostimulable storage phosphor screen, ii) stimulating said tribostimulable screen in order to release the stored energy as stimulated light, stimulated by pressure and iii) collecting said stimulated light.

It is possible to use the alkali metal phosphors in the method according to the present invention either alone or mixed with one or more other phosphors.

Mixtures of alkali metal phosphors and other storage phosphors can be useful to fine-tune the quality of the screen (e.g. sharpness, noise, speed, etc).

Opposite to the well-known optical stimulation by laser light of "classical" storage phosphors loaded with energy (as e.g. the activated barium strontium fluoro(halide) phosphors, whether or not doped with Eu and/or other dopants as disclosed in EP-A's 0 345 903 and in 0 522 605, wherein the wavelength of the stimulating laser should be within the range of the stimulation spectrum, in one embodiment of the method of the present invention stimulation proceeds in an indirect way by means of a laser source having a wavelength outside the range of the stimulation spectrum: scanning a screen or panel e.g. by a flying spot scanning laser locally generates heat, causing thereby local expansion of one pixel and, as a consequence of the thus generated local mechanical forces on the tribostimulable phosphor crystals, detectable triboluminescent signals are generated.

According to the present invention a method is thus available wherein pressure is provided pixelwise by means of a laser having a wavelength outside the range of the stimulation spectrum of the stimulable phosphors (wherein pressure is exerted indirectly by heat, further causing mechanical pressure forces by expansion). Storage phosphors known as having unsatisfactory photostimulable properties become suitable for use, provided that their tribostimulable properties are satisfying.

The storage screen or panels used in the method according to the present invention can be prepared by vacuum deposition of a phosphor according to the present invention on a support, yielding a panel or screen having substantially no binder present. It is also possible to prepare panels by electro-deposition of the phosphor onto the support, again yielding a screen or panel comprising substantially no binder. Very suitable electro-depositing techniques suitable for use in the method of the present invention are disclosed in U.S. Pat. No. 5,296,117. The storage screen or panel may be either self supporting or may comprise a mixture of alkali metal-phosphor and binder, coated on a support.

Any binder known in the art can be used in order to form a screen or panel comprising an alkali metal-phosphor suitable for use in the method according to the present invention. Suitable binders are, e.g., gelatin, polysaccharides such as dextran, arabic gum, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. Nos. 2,502,529; 2,887,379; 3,617,285; 3,300,310; 3,300,311 and 3,743,833. A mixture of two or more of these binders may be used, e.g., a mixture of polyethyl acrylate and cellulose acetobutyrate. The weight ratio of phosphor to binder in a storage panel suitable for use in the method of the present is generally within the range of from 50:50 to 99:1, preferably from 80:20 to 99:1. Preferably a self-supporting or supported layer of alkali metal-phosphor particles comprises said particles dispersed in a binding medium and a protective coating thereover characterised in that the binding medium substantially consists of one or more hydrogenated styrene-diene block copolymers, having a saturated rubber block, as rubbery and/or elastomeric polymers. The polymer can be represented by the formula A—B—A (tri-block) or by the formula A—B (di-block), wherein A represents styrene and B represents the hydrogenated diene block e.g. ethylene-butylene or ethylene-propylene. Further the ratio by volume of phoshor to binding medium is referably more than 70/30 and still more preferably more than 85/15. The coating weight of alkali metalphosphor particles can be adapted to the desired speed of the storage screen or panel, but preferably a coating weight between 5 and 250 $mg/cm^2$, most preferably between 20 and 175 $mg/cm^2$, is used. By said hydrogenated diene copolymers, for use as rubbery and/or elastomeric polymers, the phosphor layer has improved elasticity of the screen, high protection against mechanical damage and thus high ease of manipulation and allow high pigment to binder ratio without getting deteriorated by ageing after frequent reuse. Particularly suitable thermoplastic rubbers, used as block-copolymeric binders in phosphor screens in accordance with this invention are the KRATON-G rubbers, KRATON being a trade mark name from SHELL. KRATON-G thermoplastic rubber polymers are a unique class of rubbers designed for use without vulcanisation. In the published report KR.G.2.1 (INTERACT/7641/2m/1186 GP KRA/ENG) wherein a description of KRATON-G rubbers is given, the KRATON-G 1600 series rubbers are presented as block copolymers in which the elastomeric midblock of the molecule is a saturated olefin rubber. KRATON-G 1600 series rubbers are described to possess excellent resistance to degradation by oxygen, ozone and UV light and they also have high cohesive strength and retain their structural integrity at elevated temperatures. Application of the rubbers mentioned hereinbefore as a binder in phosphor screens has extensively been described in U.S. Pat. Nos. 5,569,530 and in 5,789,021.

A storage screen or panel comprising alkali metals suitable for use in the method according to the present invention can be prepared by the following manufacturing process. The phosphor layer can be applied to the support by any coating procedure, making use of solvents for the binder of the phosphor containing layer as well as of useful dispersing agents, useful plasticizers, useful fillers and subbing or interlayer layer compositions that have been described in extenso in EP-A 0 510 753. Alkali metal-phosphor particles for use in the method according to the present invention are mixed with the dissolved rubbery polymer, in a suitable mixing ratio in order to prepare a dispersion. Said dispersion is uniformly applied to a substrate by a known coating technique, e.g. doctor blade coating, roll coating, gravure coating or wire bar coating, and dried to form a phosphor layer. In the preparation of a storage screen or panel, one or more additional layers are occasionally provided between the support and the phosphor containing layer, having subbing- or interlayer compositions, so as to improve the bonding between the support and the phosphor layer, or to improve the sensitivity of the screen or the sharpness and resolution of an image provided thereby. For instance, a subbing layer or an adhesive layer may be provided by coating polymer material, e.g., gelatin, a polyester crosslinked by a reaction with a tri-isocyanate or a polyester with only terminal hydroxyl groups, the chain length of which has been increased by the reaction of said terminal hydroxyl groups and a di-isocyanate, over the surface of the support on the phosphor layer side. Said subbing layer may contain also modified thermoplastic acrylic resins such as those described above to improve the adhesion properties of the subbing layers. A light-reflecting layer may be provided, e.g. by vacuum-depositing an aluminium layer or by coating a pigment-binder layer wherein the pigment is e.g. titanium dioxide. For the manufacture of light-absorbing layer, serving as anti-halation layer, carbon black dispersed in a binder may be used but also any known anti-halation dye. Such additional layer(s) may be coated on the support either as a backing layer or interposed between the support and the phosphor containing layer(s). Several of said additional layers may be applied in combination. After applying the coating dispersion onto the support, the coating dispersion is normally heated slowly to dryness in order to complete the formation of a phosphor layer. In order to remove as much as possible air entrapped in the phosphor coating composition it can be subjected to an ultrasonic treatment before coating. Another method suitable to reduce the amount of entrapped air consists in a compression method as has been described in EP-A 393 662 wherein the said compression is preferably carried out at a temperature not lower than the softening point or melting point of the rubbery binder to improve the phosphor packing density in the dried layer.

In order to avoid electrostatic discharges during manufacture of the screen, especially during the coating procedure, conductive compounds can be added to the phosphor/binder mixture or the support can be provided with a conductive layer (lateral resistance<$10^{12}$ W/square) on that side of the support opposite to the side to be coated with the phosphor/binder mixture. If necessary, after coating the phosphor/binder mixture the conductive layer on the side of the support opposite to the phosphor/binder mixture layer, may be covered by a plastic sheet or web material. After the formation of the phosphor layer, a protective layer is generally provided on top of the phosphor layer. The protective coating composition can be applied as described e.g. in U.S. Pat. No. 4,059,768. In a preferred embodiment the protective coating composition is applied by a rotary screen printing device as has been described in detail in EP-A 510 753. The top coat is preferably formed by applying a radiation curable coating on top of the phosphor layer.

When the radiation-curing is carried out with ultraviolet radiation (UV), a photoinitiator is present in the coating composition to serve as a catalyst in order to initiate the polymerization of the monomers and their optional cross-linking with the pre-polymers resulting in curing of the coated protective layer composition. To the radiation-curable coating composition there may be added a storage stabilizer, a colorant, and other additives, and then dissolved or dispersed therein to prepare the coating liquid for the protective layer. Examples of colorants that can be used in the protective layer include MAKROLEX ROT EG, MAKROLEX ROT GS and MAKROLEX ROT E2G. MAKROLEX is a registered tradename of Bayer AG, Leverkusen, Germany.

A variety of other optional compounds can be included in the radiation-curable coating composition of the present storage article such as compounds to reduce static electrical charge accumulation, plasticizers, matting agents, lubricants, de-foamers and the like as has been described in the EP-A 510 753. In said document a description has also been given of the apparatus and methods for curing, as well as a non-limitative survey of X-ray conversion screen phosphors, of photostimulable phosphors and of binders of the phosphor containing layer. The cured protective layer can also comprise phosphor particles. In doing so the speed/sharpness relation and the SNR (signal to noise ratio) of the screen can be improved.

The edges of the screen, being especially vulnerable by multiple manipulation, may be reinforced by covering the edges (side surfaces) with a polymer material being formed essentially from a moisture-hardened polymer composition prepared according to EP-A 0 541 146. An other very useful way to reinforce of the edges of a screen or panel, also those comprising alkali metal phosphors suitable for use in the method according to the present invention, is to coat the edges with a polymeric composition comprising polyvinylacetate, crotonic acid and isocyanates. Preferably a copolymer of vinylacetate and crotonic acid (e.g. MOWILITH CT5, a trade name of Hoechts AG, Frankfurt, Germany) is used in combination with isocyanates.

Support materials for storage screens suitable for use in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material. The plastic film may contain a light-absor-bing material such as carbon black, or may contain a light-reflecting material such as titanium dioxide or barium sulfate. The former is appropriate for preparing a high-resolution type storage screen, while the latter is appropriate for preparing a high-sensitivity type storage screen. Examples of preferred supports include polyethylene terephthalate, clear or blue colored or black colored (e.g., LUMIRROR C, type X30, (trade name) supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties. These supports may have thicknesses which may differ depending on the material of the support, and may generally be between 60 and 1000 $\mu$m, more preferably between 80 and 500 $\mu$m from the standpoint of handling. A screen or panel comprising an alkali metal-phosphor suitable for use in the method according to the present invention may carry an antistatic layer either on top of a protective layer or on the side of the support opposite to the side carrying said alkali metal-phosphor. Said antistatic layer may comprise inorganic antistatic agents, e.g. metal oxides, as disclosed in, e.g., EP-A 0 579 016 as well as organic antistatic agents (polyethylene oxides, poly(ethylenedioxythiophene) as disclosed in, e.g., EP-A 0 440 957.

In the method according to the present invention detecting (or collecting) said energy stored in tribostimulable storage phosphor panels proceeds by means of a CCD, a PMT or a photodiode-array. In a preferred embodiment thereof said said CCD, PMT or photodiode-array is in indirect contact with the storage panel by means of a fiber optic plate or in the alternative by means of an array of focusing cells or lenses.

A particular application of the present invention provides a method to determine in a quantitative way stored amounts of radiation energy originating from radiation having a wavelength of 350 nm or less, comprising the steps of:

i) providing a personal monitor comprising a housing, a storage phosphor panel providing energy conversion of said storage phosphor panel by means of pressure energy; wherein said phosphor panel is capable to absorb incident radiation energy originating from radiation having a wavelength of 350 nm or less, wherein said storage medium comprises a storage phosphor panel capable to store said radiation energy, wherein said panel is covered with an optical filter absorbing radiation having a wavelength of 350 nm or more;

ii) opening the housing of said monitor thereby irradiating said storage phosphor panel covered with said optical filter by incident radiation in such a way that said panel is exposed proportionally and simultaneously with an object which is sensitive to said radiation;

iii) closing the said housing, iv) reading out said storage phosphor panel by the steps of entering the personal monitor in a read-out apparatus, adding stimulating energy to the said storage phosphor panel by means of pressure, digitally detecting energy released from said storage phosphor panel by a detector;

v) erasing stored rest energy.

Apart from the use of tribostimulable phosphors as described according to the method of the present invention, all other embodiments in order to provide means for personal monitoring by measuring irradiation of the human skin by (over)exposure to harmful UV-A and UV-B radiation originating from sun-rays and/or sun panels, have been described in EP-A 0 892 283.

In another embodiment according to the present invention a method has been provided for monitoring a dose of penetrating radiation absorbed by an object, wherein said method comprises the steps of (i) providing said object with a device for absorbing penetrating radiation, including a storage phosphor for storing energy from said penetrating radiation, (ii) coupling said storage phosphor at predetermined intervals to a source of pressure, in such a way that said pressure performs a pressure force on said phosphor, (iii) activating said source of pressure in order to cause said storage phosphor to emit an amount of fluorescent light in proportion to an amount of stored energy, (iv) reading said amount of fluorescent light and converting it in an electric signal value, (v) storing electric signal value(s) obtained at said predetermined intervals and processing them in order to evaluate a total amount of radiation absorbed by said object, (vi) comparing said total amount with a predefined threshold value in order to obtain a figure as a difference of values, and (vii) displaying said figure on a decentralized display.

Apart from the use of tribostimulable phosphors as described according to the method of the present invention, all other embodiments in order to provide a device in form of a practical and reusable card for personal monitoring and reading of incident penetrating radiation energy as disclosed in EP-Application No. 99200436, filed Feb. 13, 1999.

EXAMPLES

While the present invention will hereinafter be described in connection with preferred embodiments thereof, it will be understood that it is not intended to limit the invention to those embodiments.

Determination of "Tribostimulability" Properties of the Phosphors

In order to determine whether or not the phosphor was showing tribostimulable properties, the phosphor was exposed to X-rays (200 kV, 10 mA) without filtering in dark with a dose of about 10 mGray. The phosphor crystal having two flat parallel surfaces was placed on a table. With an optical filter BG39(3 mm) of Schott the crystal was pressed manually between the table and the optical filter. Because the experiment was performed in a dark room, the emitted light was seen through the optical filter at the moment that a pressure force was applied. The intensity of the emitted light caused by the pressure force was very much higher than the emitted light caused by afterglow. It was found also that the crystals are emitting strongly when the surface of the crystal was damaged with e.g. a knife or even with a nail of a finger. When the crystal was cracked, an intense light pulse was detected. When the crystal was not exposed to X-ray or was completely erased with a light source, no emitted light was found after carrying out the same experiments wherein a pressure force was applied to the crystal, wherein the crystal was damaged or cracked. From these experiments it became clear that only stored energy, captured after a previous exposure with ionization radiation (as e.g. X-rays) of a composite storage phosphor crystal suitable for use in the method of the present invention was released by pressing, damaging or cracking the said crystal.

In order to make images of phantoms exposed with X-rays, the exposed phosphor panel was placed between a pressure source and a detector. This detector was a CCD with an Optical Fiber Plate or a cell foc lens. Pressure was performed in following ways:

1) onto the complete plate;
2) linewise;
3) pixelwise.

Figure 2:
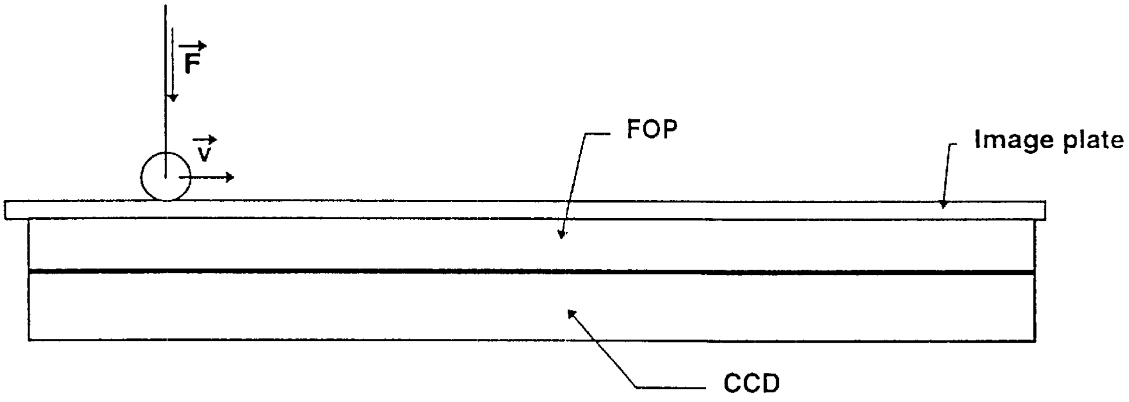
FIG. 2 shows an Image Plate essentially consisting of a storage phosphor plate, just as in FIG. 1, wherein an "X-ray" image has been stored. By means of a continuously rolling roller (opposite to the discontinuous linewise registration by the Knife Edge as in FIG. 1), wherein the said roller linewise performs a pressure force F on the Image Plate, the stored energy is released and becomes read-out by a CCD via a Fibre Optic Plate (FOP).
Figure 3:
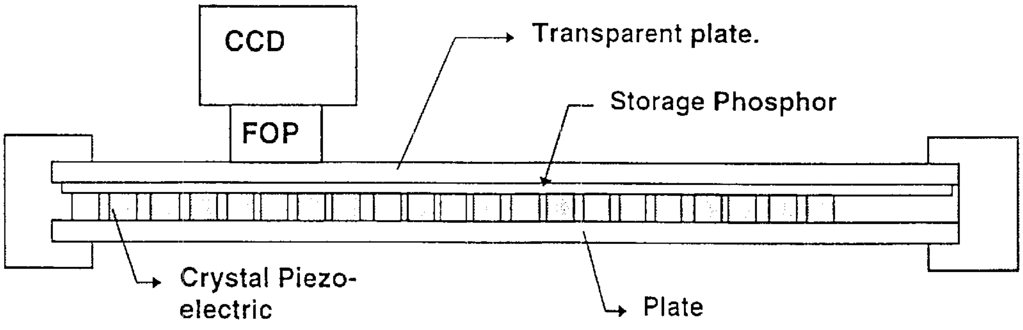
FIG. 3 shows a Plate carrying a layer having Piezo-electric Crystals, whereupon and in direct contact with it, the Storage Phosphor layer is present, said Storage Phosphor layer being covered with a Transparent plate. The "X-ray" image stored in the the Storage Phosphor layer is read-out after release of stored energy by a pressure force generated pixelwise by the said Piezo-electric Crystals. As a detector, just as in FIG. 1 use is made of a CCD, capturing the pressure converted and released energy via a Fibre Optic Plate (FOP).

As pressure sources following sources were applied:

1) a knife-edge (FIG. 1)—in order to get a linewise detection over the whole storage phosphor plate or panel in a discontinuous way by alternatively moving the plate up and down;
2) a roller-system (FIG. 2)—in order to get a linewise detection over the whole storage phosphor plate or panel in a continuous way;
3) a panel having piezo-electrical crystals positioned in a 2 dimensional matrix (FIG. 3)—in order to get pixelwise detection over the whole phosphor plate. The storage phosphor panel and the piezo-electrical crystals were placed between two plates, wherein at least one of them was transparent for the light emitted after pressure stimulation by the energy-loaded storage phosphor. In order to read out a pixel a voltage was applied to the piezo-electrical crystal positioned to the said pixel. As the crystal was expanding thereby, its pressure thus generated was applied to the storage phosphor and, consequently the pressure stimulable storage phosphors were emitting energy to be read-out. Separately activated piezo-electrical crystals thus provided all pixels to be read one after the other, thus generating a read-out pattern, corresponding with the original phantom image.

Having described in detail preferred embodiments of the current invention, it will now be apparent to those skilled in the art that numerous modifications can be made therein without departing from the scope of the invention as defined in the appending claims.

What is claimed is:

1. Method of radiographic image formation, dosimetry or personal monitoring, wherein said method comprises the steps of (a) storing energy in stimulable phosphors coated in one or more layers of said screen or panel;

(b) converting said energy to emission energy and (c) detecting said energy, characterized in that said converting step proceeds by means of a source of pressure energy.

2. Method according to claim 1, wherein said stimulable phosphor is a alkali metal-halide phosphor.

3. Method according to claim 2, wherein said stimulable phosphor has a composition further comprising a dopant selected from the group consisting of Eu, Gd, Ga, Ca, Sr, Ge, Sn, Au, Tl, In, Sb, Tb and Ce or a combination thereof.

4. Method according to claim 3, wherein said dopant(s) is(are) present in an amount of from 500 up to 50000 p.p.m.

5. Method according to claim 1, wherein said stimulable phosphor has a composition comprising at least one of CsBr, CsCl, RbBr, KBr or KCl.

6. Method according to claim 1, wherein said stored energy is corresponding with a latent image formed by irradiation exposure.

7. Method according to claim 1, wherein said energy is provided by irradiation exposure with X-rays.

8. Method according to claim 1, wherein pressure is provided pixelwise by means of piezo-electrical crystals as a source of pressure energy.

9. Method according to claim 1, wherein pressure is provided pixelwise by means of a laser having a wavelength outside the range of the stimulation spectrum of the stimulable phosphors.

10. Method according to claim 1, wherein detecting proceeds by means of a photo-multiplier, a photodiode-array or a CCD, wherein said CCD, said photo-multiplier or said photodiode-array is in indirect contact with the storage panel by means of a fiber optic plate.

11. Method according to claim 10, wherein said CCD, PMT or photodiode-array is in indirect contact with the storage panel by means of an array of focusing cells or lenses.

12. Method to determine in a quantitative way stored amounts of radiation energy originating from radiation having a wavelength of 350 nm or less, comprising the steps of:

i) providing a personal monitor comprising a housing, a storage phosphor panel providing energy conversion of said storage phosphor panel by means of pressure energy; wherein said phosphor panel is capable to absorb incident radiation energy originating from radiation having a wavelength of 350 nm or less, wherein said storage medium comprises a storage phosphor panel capable to store said radiation energy, wherein said panel is covered with an optical filter absorbing radiation having a wavelength of 350 nm or more;

ii) opening the housing of said monitor thereby irradiating said storage phosphor panel covered with said optical filter by incident radiation in such a way that said panel is exposed proportionally and simultaneously with an object which is sensitive to said radiation;

iii) closing the said housing, iv) reading out said storage phosphor panel by the steps of entering the personal monitor in a read-out apparatus,
  adding stimulating energy to the said storage phosphor panel by means of pressure,
  digitally detecting energy released from said storage phosphor panel by a detector;

v) erasing stored rest energy.

13. Method for monitoring a dose of penetrating radiation absorbed by an object, comprising the steps of (i) providing said object with a device for absorbing penetrating radiation, including a storage phosphor for storing energy from said penetrating radiation, (ii) coupling said storage phosphor at predetermined intervals to a source of pressure, in such a way that said pressure performs a pressure force on said phosphor, (iii) activating said source of pressure in order to cause said storage phosphor to emit an amount of fluorescent light in proportion to an amount of stored energy, (iv) reading said amount of fluorescent light and converting it in an electric signal value, (v) storing electric signal value(s) obtained at said predetermined intervals and processing them in order to evaluate a total amount of radiation absorbed by said object, (vi) comparing said total amount with a predefined threshold value for obtaining a figure as a difference of values, and (vii) displaying said figure on a decentralized display.

* * * * *